(12) United States Patent
de la Garza Villarreal et al.

(10) Patent No.: US 11,782,533 B2
(45) Date of Patent: *Oct. 10, 2023

(54) VIRTUAL PERIPHERALS FOR MOBILE DEVICES

(71) Applicant: Lodestar Licensing Group LLC, Evanston, IL (US)

(72) Inventors: Elsie de la Garza Villarreal, Nampa, ID (US); Claudia A. Delaney, Garden City, ID (US); Madison E. Wale, Boise, ID (US); Bhumika Chhabra, Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/571,385

(22) Filed: Jan. 7, 2022

(65) Prior Publication Data

US 2022/0129086 A1 Apr. 28, 2022

Related U.S. Application Data

(63) Continuation of application No. 16/879,723, filed on May 20, 2020, now Pat. No. 11,221,690.

(51) Int. Cl.
*G06F 3/038* (2013.01)
*H04M 1/02* (2006.01)

(52) U.S. Cl.
CPC .......... *G06F 3/038* (2013.01); *H04M 1/0272* (2013.01)

(58) Field of Classification Search
None
See application file for complete search history.

(56) References Cited

U.S. PATENT DOCUMENTS

| | | |
|---|---|---|
| 8,942,984 B2 | 1/2015 | Kim et al. |
| 9,466,267 B2 | 10/2016 | Shin et al. |
| 9,651,991 B2 | 5/2017 | Kim et al. |
| 2011/0154249 A1 | 6/2011 | Jang et al. |
| 2012/0249741 A1 | 10/2012 | Maciocci et al. |
| 2014/0347295 A1 | 11/2014 | Kim et al. |
| 2019/0121522 A1 | 4/2019 | Davis et al. |

*Primary Examiner* — Duane N Taylor, Jr.
(74) *Attorney, Agent, or Firm* — Holland & Hart LLP (57) ABSTRACT

Methods and apparatuses for a mobile device (e.g., a mobile phone) supporting virtual peripherals are described. The mobile device may include a projecting component configured to project images to external surfaces outside of the mobile device. In some cases, the mobile device may project an image of a document on a first external surface and an image of a keyboard on a second external surface. Moreover, the mobile device may include an imaging component to receive inputs based on sensing an input device overlaid on the projected image (e.g., the keyboard). Accordingly, the mobile device may function as a computer with an external monitor and a keyboard, virtually added to the mobile device. In some cases, the mobile device may serve two or more users or purposes at a time. For example, the mobile device may operate as an infotainment device of a vehicle.

9 Claims, 5 Drawing Sheets

VIRTUAL PERIPHERALS FOR MOBILE DEVICES

CROSS-REFERENCE TO RELATED APPLICATION(S)

This application is a continuation of U.S. application Ser. No. 16/879,723, filed May 20, 2020; which is incorporated herein by reference in its entirety.

TECHNICAL FIELD

The present disclosure generally relates to mobile devices, and more particularly relates to virtual peripherals for mobile devices.

BACKGROUND

Mobile devices (e.g., mobile phones, cellular phones, tablets, laptop computers) are widely deployed, assisting users in many aspects of their daily lives. For example, the users may travel with one or more mobile devices maintaining connections with their contacts (e.g., using cellular phones), while performing various tasks away from their office (e.g., using laptop computers). As form factors scale for the mobile devices, the users face challenges in directly interacting with the mobile devices using certain input/output devices having limited physical dimensions (e.g., a touchscreen, a keypad displayed on a surface of a mobile device). As compute power increases for the mobile devices, however, certain mobile devices become capable of performing complex tasks that require extensive user interactions. Accordingly, it would be beneficial for the users to have their mobile devices operating beyond their physical dimensions, as well as serving more than one user and/or purpose at a time.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Mobile devices (e.g., smart wristbands, smart watches, cellular phones, mobile phones, tablets, laptop computers) provide convenient and versatile tools for users. For example, mobile phones can make telephone calls, provide digital contents for the users, and/or display driving directions guided by a global positioning system (GPS). Moreover, the mobile phones are continuously improved to include more compute power than previous generations of mobile phones such that they can successfully perform certain tasks, which are traditionally reserved for computing devices with larger physical dimensions, such as desktop computers, laptop computers, or the like. The users, however, may find it inconvenient to use the mobile phones to execute such tasks due to small form factors, restricting their interactions to further take advantage of the compute power of the mobile phones—e.g., drafting complex documents, manipulating data with spreadsheets, etc.

Several embodiments of the present technology may facilitate mobile devices to operate with virtually augmented and/or virtually added input/output components (e.g., monitors, keyboards, mouse, etc., which may be referred to as peripherals and/or peripheral devices, collectively). As a result, the users may perform certain tasks using their mobile phones without having to burden themselves with physically constrained peripherals of the mobile phones—e.g., the mobile phones may operate like laptop computers via the virtually augmented and/or virtually added peripherals ("virtual peripherals"). Moreover, the mobile devices may simultaneously serve more than a single user and/or purpose at a time—e.g., the mobile phones may function as an infotainment device of a vehicle, displaying driving directions for a driver, while providing digital contents for passengers of the vehicle.

In some embodiments, the mobile device may include a projecting component configured to project one or more images to at least one external surface outside of the mobile device, in addition to a first screen of its own (e.g., a touchscreen of a mobile phone). Such a projecting component may include various parts, such as a light source (e.g., light-emitting-diodes (LEDs), a laser source, etc.), an optics unit (e.g., one or more lenses, an array of micromirrors, optical fibers, etc.), an electronic controller (e.g., circuits based on complementary-metal-oxide-semiconductor (CMOS) and/or other suitable semiconductor technology), or the like. The projecting component may include a laser-beam scanning projector, a CMOS-controlled micro-LED projector, a micro-projector based on a liquid-crystal display on silicon, among others. In some embodiments, the mobile device can couple with at least one external device having a second screen such that the external device may display images generated by the mobile device. Such external devices may include a tablet, a mobile phone, a liquid-crystal display (LCD), or the like. Accordingly, the mobile device may include a routing component configured to route images to one or more corresponding destinations—e.g., the first screen, the external surface via the projecting component, the second screen of the external device coupled with the mobile device. Further, the mobile device may be configured to carry out multiple applications at any given time (e.g., a first application providing driving directions, a second application assisting active reading, a third application streaming audio/video contents, etc.) that each generate disparate images to be displayed at different destinations.

In some embodiments, the mobile device may receive an input from the user based on projecting an image on an external surface using the projecting component. For example, the mobile device may generate an image of a keyboard, and project the image to a table through the projecting component, i.e., a virtual keyboard added for the user. Subsequently, the user may place his/her hands laying over the displayed image of the keyboard, and virtually "type" a character by pressing (touching or otherwise selecting) one of the keys displayed (e.g., a letter "y") in the virtual keyboard. The mobile device may monitor the location of the user's hand (or fingers) and/or motions associated with selecting the letter "y"—e.g., using a camera included in the mobile device. In this manner, the mobile device may determine a relative position of the user's hand (e.g., an index finger of the user's right hand in particular, which may be regarded as an input device of the user for typing the letter "y") with respect to the projected image of the keyboard, and determine that the user entered the letter "y." Thereafter, the mobile device may display the letter "y" on the first screen and/or on a different external surface (e.g., a wall) using the projecting component.

In this manner, the mobile device may operate as a desktop computer, by adding a virtual monitor or terminal (e.g., the wall displaying a document that the user is working on), as well as a virtual keyboard (e.g., the table displaying the image of the keyboard). By way of example, the mobile device may generate a first image of a document, and project the first image to a first external surface (e.g., a wall functioning as a virtual monitor) using the projecting component. The mobile device may also generate a second image of a keyboard, and project the second image to a second external surface (e.g., a table functioning as a virtual keyboard in conjunction with the image of the keyboard). The user may provide inputs (e.g., typing sentences) to the mobile device using the second image of the keyboard (i.e., the virtual keyboard) such that the mobile device may display the user's inputs (e.g., the sentences) to the first image (i.e., the document displayed on the virtual monitor). In some embodiments, the projecting component may include a light projecting component (e.g., a flash light) of the mobile device. Moreover, the mobile device may utilize an imaging component (e.g., a camera) of the mobile device to capture (otherwise receive or sense) the user's inputs.

Figure 1A:
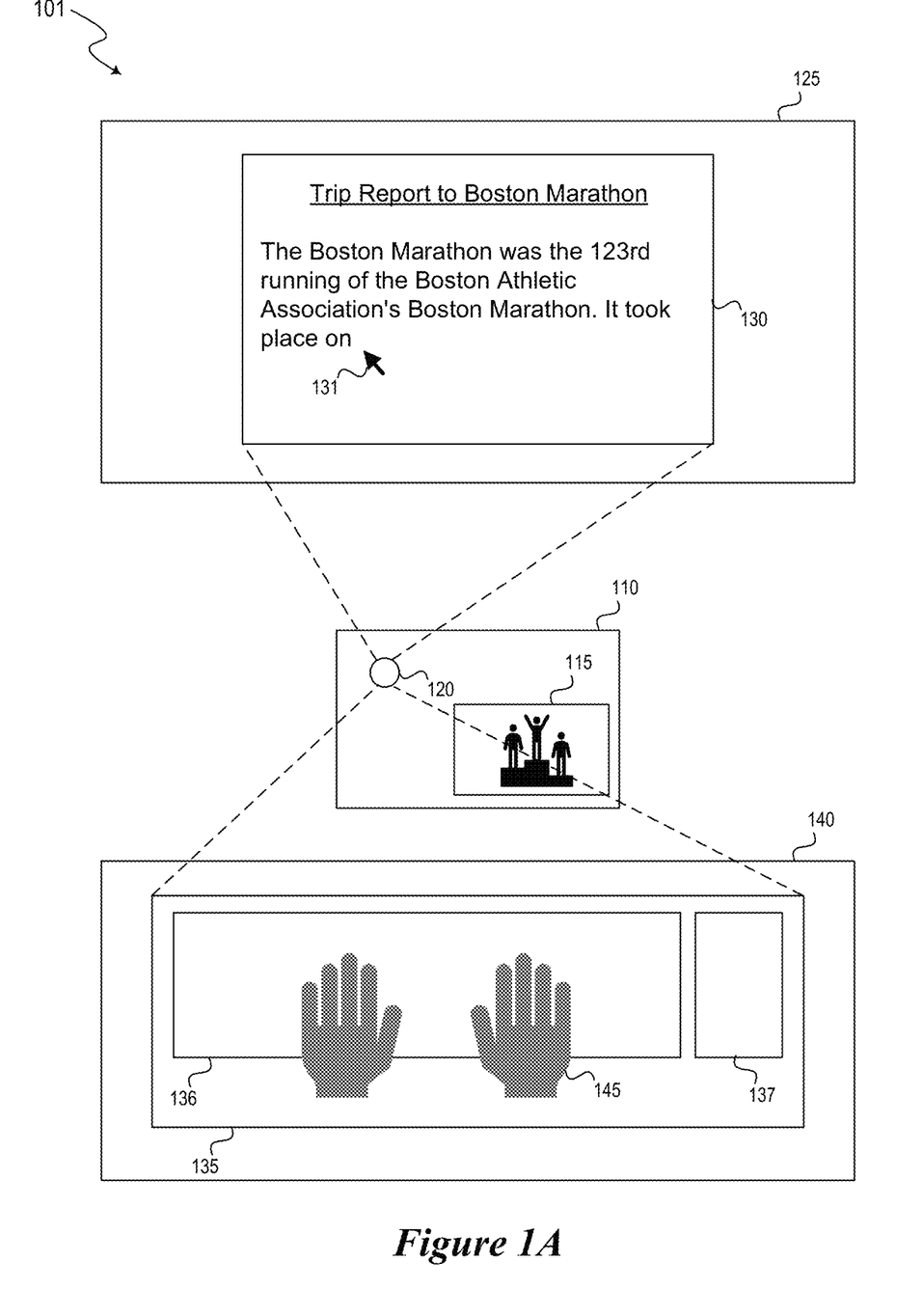
FIGS. 1A and 1B are schematic diagrams illustrating virtual peripherals for mobile devices in accordance with embodiments of the present technology.
Figure 1B:
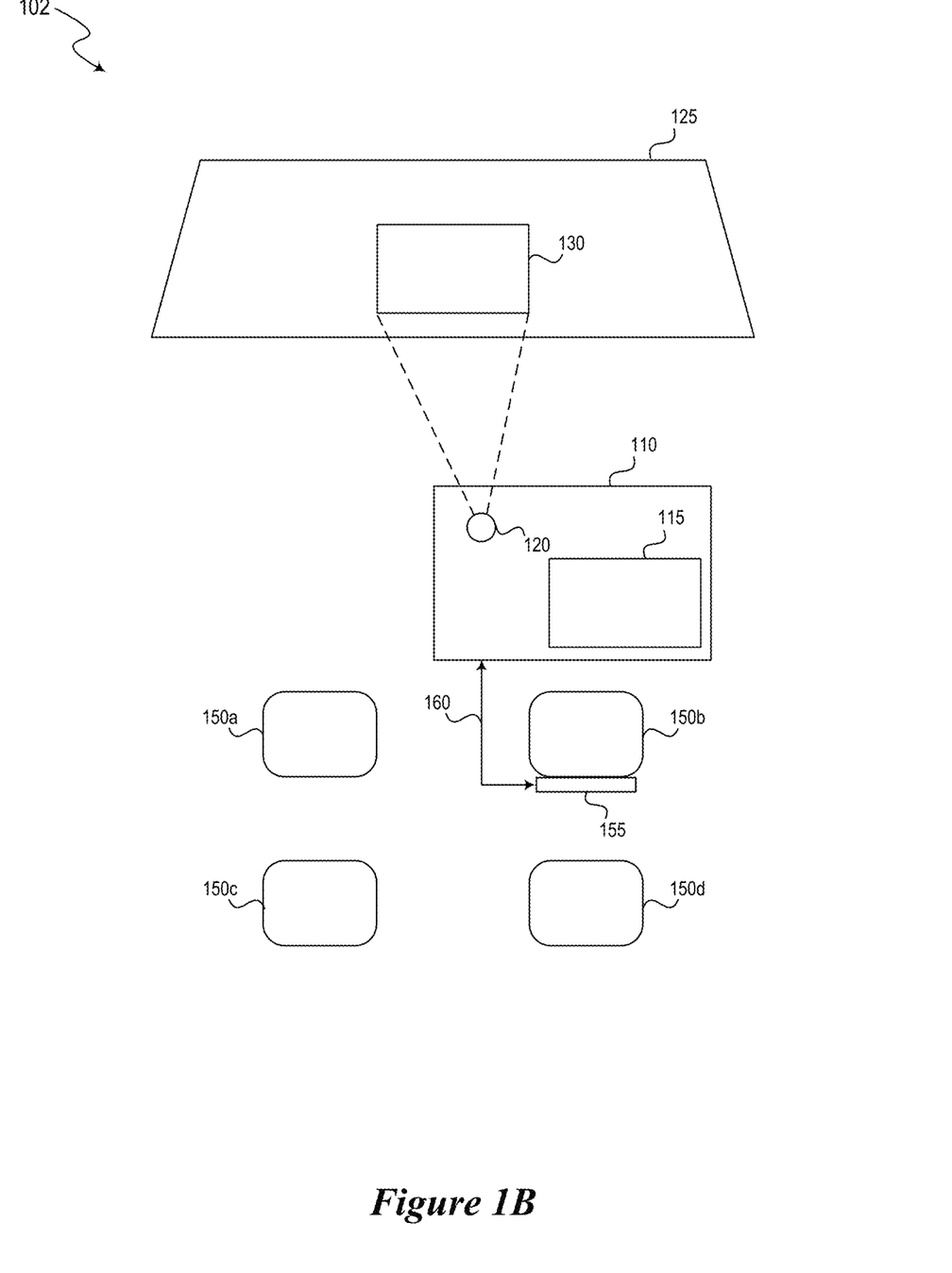

Schematic diagrams illustrating virtual peripherals for mobile devices in accordance with embodiments of the present technology are shown in FIGS. 1A and 1B. A block diagram including a mobile device that supports virtual peripherals in accordance with embodiments of the present technology is described with reference to FIG. 2. Flowcharts of methods for virtual peripherals for mobile devices in accordance with embodiments of the present technology are described with reference to FIGS. 3 and 4.

FIG. 1A is a schematic diagram 101 illustrating virtual peripherals for a mobile device in accordance with embodiments of the present technology. The diagram 101 may depict a situation where a user of the mobile device (e.g., a mobile phone) operates the mobile device similar to a desktop computer or a laptop computer having a separate monitor (or a terminal) and a separate keyboard (e.g., a full-size keyboard), by using virtual peripherals that the mobile device generates. The diagram 101 illustrates a mobile device 110 including a first screen 115 and a projecting component 120. The projecting component 120 may be configured to project one or more images that the mobile device 110 generates to an external surface (e.g., a first external surface 125, a second external surface 140) outside of the mobile device 110.

For example, the diagram 101 depicts a first image 130 (e.g., a document about the Boston Marathon that the user drafts) that the mobile device 110 generates. The projecting component 120 can project the first image 130 on the first external surface 125. In this manner, the first external surface 125 may function as a separate monitor (or a terminal) virtually added to the mobile device 110 for the user. Such a projected image can be significantly larger than that displayed on the first screen 115 to assist the user in various situations—e.g., relieving the user from working with a constrained field of view of the first screen 115 when drafting and/or reviewing a complicated document, facilitating the user to appreciate details of the projected image when analyzing a complex diagram, etc. Additionally, or alternatively, the projected image may include two or more objects to show (e.g., two or more windows that each include different contents) such that the user may work with multiple objects at any given time by projecting the image to the first external surface 125.

Further, the diagram 101 depicts a second image 135 projected to the second external surface 140. The second image 135 may include a keyboard 136, a mouse pad 137, or both. In some cases, the mobile device 110 can generate and project such an image of input devices to enable the user to enter inputs to the mobile device 110 without having to be limited by a physical dimension of the mobile device 110—e.g., a keypad displayed on the first screen 115 prohibiting the user fitting both hands to type. That is, the keyboard 136 of the second image 135 projected to the second external surface 140 may be large enough for the user to use both hands to type (e.g., a full-size keyboard).

In some embodiments, the projecting component 120 may be configured to project more than one images to corresponding external surfaces, respectively. For example, the projecting component 120 may project the first image 130 to the first external surface 125 for a first duration. Subsequently, the projecting component may project the second image 135 to the second external surface 140 for a second duration, where the first and second durations alternate in time. In some embodiments, the first and second durations may be determined such that both the first and second images 130 and 135 may appear seamlessly for the user— e.g., seamlessly to the user's eyes, based on the afterimage effect. In this regard, projecting the first image 130 may be regarded as concurrent (e.g., simultaneous) with projecting the second image 135. In some embodiments, the mobile device 110 may include more than one projecting components such that at least one projecting component may be configured to project one image, while other projecting components may be configured to project more than one images to corresponding external surfaces, as described herein.

Moreover, the mobile device 110 may receive inputs from the user based on the projected images (e.g., the first image 130, the second image 135). For example, after projecting the image of the keyboard 136 on the second external surface 140, the mobile device 110 may determine the user's hands 145 are positioned on the projected image of the keyboard 136—e.g., using a camera of the mobile device 110. In some embodiments, the mobile device 110 may include additional components suitable for receiving inputs from the user based on the projected image, such as an infrared sensor coupled with an illumination source, image sensors utilizing active-pixel sensors (e.g., MOS-based) and/or charge-coupled devices (CCDs), or the like.

Subsequently, the mobile device 110 may determine a relative position of the user's particular finger (e.g., an index finger of the user's right hand, which may be regarded as part of an input device of the user, namely both hands and fingers), with respect to the projected image of the keyboard 136. In some cases, the mobile device 110 may sense a motion of the user's hands and/or fingers to receive inputs from the user (e.g., via the camera and/or the sensors)—e.g., the motion indicating the user's inputs corresponding to letters or functions keys of the keyboard 136. In some embodiments, the mobile device 110 may be configured to monitor for vibrations associated with impacts of fingertips with a surface on which the mobile device 110 is placed— e.g., to facilitate the mobile device 110 receiving inputs from the user. In this manner, the user can enter inputs to the mobile device 110 based on the projected image of the keyboard 136 (e.g., typing a letter "y" using the index finger). Thereafter, the mobile device 110 may project the input from the user (e.g., the letter "y") to the first external surface 125 (e.g., the document displayed in the first image 130, updated with the user's input).

In some embodiments, the mobile device 110 may receive inputs from the user based on user's body gestures overlaid on the projected images (e.g., the first image 130, the second image 135). For example, the user may present slides (e.g., the first image 130 showing one of the presentation slides) projected to the first external surface 125. The mobile device 110 may determine that the user (or at least some parts of the user, e.g., the user's arm) is positioned on the projected image of the slides (e.g., using the camera). Subsequently, the mobile device 110 may determine that the user makes a preconfigured gesture to instruct the mobile device 110 to make a certain operation—e.g., waiving the user's right hand indicating to display the next slide, making a fist over a projected image of a hyperlink of the slide indicating to activate the hyperlink, etc.

Similarly, if the second image 135 of the peripheral device displayed on the second external surface 140 includes the mouse pad 137, the mobile device 110 may receive the user's inputs related to a cursor 131 to determine its positions and/or movements (e.g., current locations of the cursor 131, movements of the cursor 131). For example, the mobile device 110 may identify a location of the cursor 131 to be projected on the first external surface 125, by determining a relative position of the user's input device (e.g., one or more fingers, a particular finger, a stylus) with respect to the image of the mouse pad 137 displayed on the second external surface 140. In some embodiments, the mobile device 110 may repeatedly monitor the relative positions of the user's input device (e.g., every 100 nsec, 1 µsec, or the like) such that the mobile device 110 may update and display current locations of the cursor 131 on the first external surface 125, real time. In other embodiments, the mobile device 110 may display the cursor 131 at a first location on the first external surface 125 by determining a first relative position of the user's input device with respect to the displayed image of the mouse pad 137. Thereafter, the mobile device 110 may sense a movement of the input device within the mouse pad 137 (e.g., using the camera), and identify a second location of the cursor 131 by determining a second relative position of the user's input device with respect to the displayed image of the mouse pad 137. The mobile device 110, based on determining the second location of the cursor 131 different from the first location, can display the cursor 131 at the second location on the first external surface 125.

The user's input device may include a stylus, one or more fingers of the user (e.g., all or a subset of fingers of the user's both hands), the user's hands (e.g., hands forming different shapes such as a closed fist, a flat hand, a fist with the index and middle finger extended), and/or any part of the user's body (e.g., arms). Moreover, the first external surface 125 (and/or the second external surface 140) may include an opaque surface (e.g., a wall, a table, a screen), which may be flat in some cases, or uneven in other cases. In some cases, the first external surface 125 (and/or the second external surface 140) may include a transparent surface (e.g., a glass wall, a glass table, a windshield of a vehicle) or a semi-transparent surface.

In some embodiments, the mobile device 110 may display (and/or project) a common image at more than one destination—e.g., the first screen 115, the first external surface 125, the second external surface 140. For example, the mobile device 110 may display the first image 130 on the first screen 115 and project the first image 130 to the first external surface 125 at the same time. In other embodiments, the mobile device 110 may be configured to display (or project) different images on the first screen 115 and to the first external surface 125. For example, the mobile device 110 may project the first image 130 to the first external surface 125, without displaying the first image 130 on the first screen 115. In such embodiments, the mobile device 110 may turn the first screen 115 blank (e.g., to save power) or display a different image than the first image 130 on the first screen 115—e.g., the mobile device 110 having two terminals that each display images different from each other.

FIG. 1B is a schematic diagram 102 illustrating virtual peripherals for mobile devices in accordance with embodiments of the present technology. The diagram 102 may depict a situation where a user of the mobile device operates the mobile device (e.g., a mobile phone) in a passenger compartment of a vehicle (e.g., as an infotainment system of the vehicle). The diagram 102 includes the mobile device 110 described with reference to FIG. 1A, as well as passenger seats 150 (also identified individually as passenger seats 150a through 150d) in the passenger compartment. Further, the diagram 102 includes a separate device 155 with a second screen. The separate device 155 may include a tablet, a liquid-crystal display (LCD) attached to the passenger seat 150b, or the like. The separate device 155 may be coupled with the mobile device 110 via a link 160, which may be wireless in some cases. As described below in more detail, the mobile device 110 can serve more than a single user and/or purpose at any given time.

The mobile device 110 may operate a first application (e.g., a driving direction application providing a map and/or an instruction for a driver to follow) for a first passenger (e.g., a driver at the passenger seat 150a). Accordingly, the mobile device 110 may generate a first image 130 that may include a map (and other associated information such as next turns, road conditions, traffic congestions, or the like). The projecting component 120 of the mobile device 110 may project the first image 130 to the first external surface 125 (e.g., a windshield of the vehicle). As such, the first image 130 may be regarded as a heads-up display projected to the windshield.

The mobile device 110 may also operate a second application (e.g., an application that assists a user's active reading) for a second passenger (e.g., a passenger at the passenger seat 150b). Accordingly, the mobile device 110 may also generate a second image for the active reading application (e.g., a text and/or various pictures associated with the text). The mobile device 110 may display the second image on the first screen 115 for the second passenger.

Further, the mobile device 110 may also operate a third application (e.g., an application that provides digital contents (e.g., an animation movie) for a user) for a third passenger (e.g., another passenger at the passenger seat 150d). Accordingly, the mobile device 110 may generate a third image that may include the digital contents. The mobile device 110 may display the third image on the second screen of the separate device 155 for the third passenger. In this manner, the mobile device 110 may operate to serve two or more users and/or purposes at any given time.

The mobile device 110 may include a routing component configured to route one or more images that the mobile device 110 generates (e.g., the first image, the second image, the third image) to corresponding destinations, respectively—e.g., the first external surface 125 through the projecting component 120, the first screen 115, the second screen of the separate device 155 via the link 160. Accordingly, the mobile device 110 may transmit the one or more images to the corresponding destinations, after coupling the routing component with corresponding components and/or devices (e.g., the projecting component 120, the first screen 115, the separate device 155 via the link 160).

In some embodiments, the routing component may be configured to couple with two or more components and/or devices at a time. Accordingly, the routing component may simultaneously route two or more images at any given time to corresponding destinations, respectively. That is, the mobile device 110 may simultaneously display (and/or project) two or more images to corresponding destinations.

In other embodiments, the routing component may be configured to couple with one component (or device) at a time. Accordingly, the routing component may route one image to one destination at a time. For example, the routing component may route the first image to a first destination (e.g., the first external surface 125) during a first duration. Subsequently, the routing component may route the second image to a second destination (e.g., the first screen 115) during a second duration following the first duration. Further, the routing component may route the third image to a third destination (e.g., the second screen of the separate device 155) during a third duration following the second duration, and so on. The mobile device 110 may determine lengths of the first, second, third durations in a series in time, each of the durations taking turns, such that the first, second, third images appear seamlessly to individual passengers, e.g., based on the afterimage effect. In this manner, the mobile device 110 may concurrently display (and/or project) two or more images to corresponding destinations for the users—e.g., to the users' eyes.

Individual lengths of the durations may be equal or different from each other. For example, the mobile device 110 may configure the first duration relatively longer than the second and/or third durations if the longer first duration benefits the driver—e.g., when updating driving instructions frequently. On the contrary, the mobile device 110 may configure the first duration relatively shorter than the second and/or third durations if the shorter first duration is adequate to provide driving instructions the driver—e.g., when driving a highway for a long-distance trip.

Figure 2:
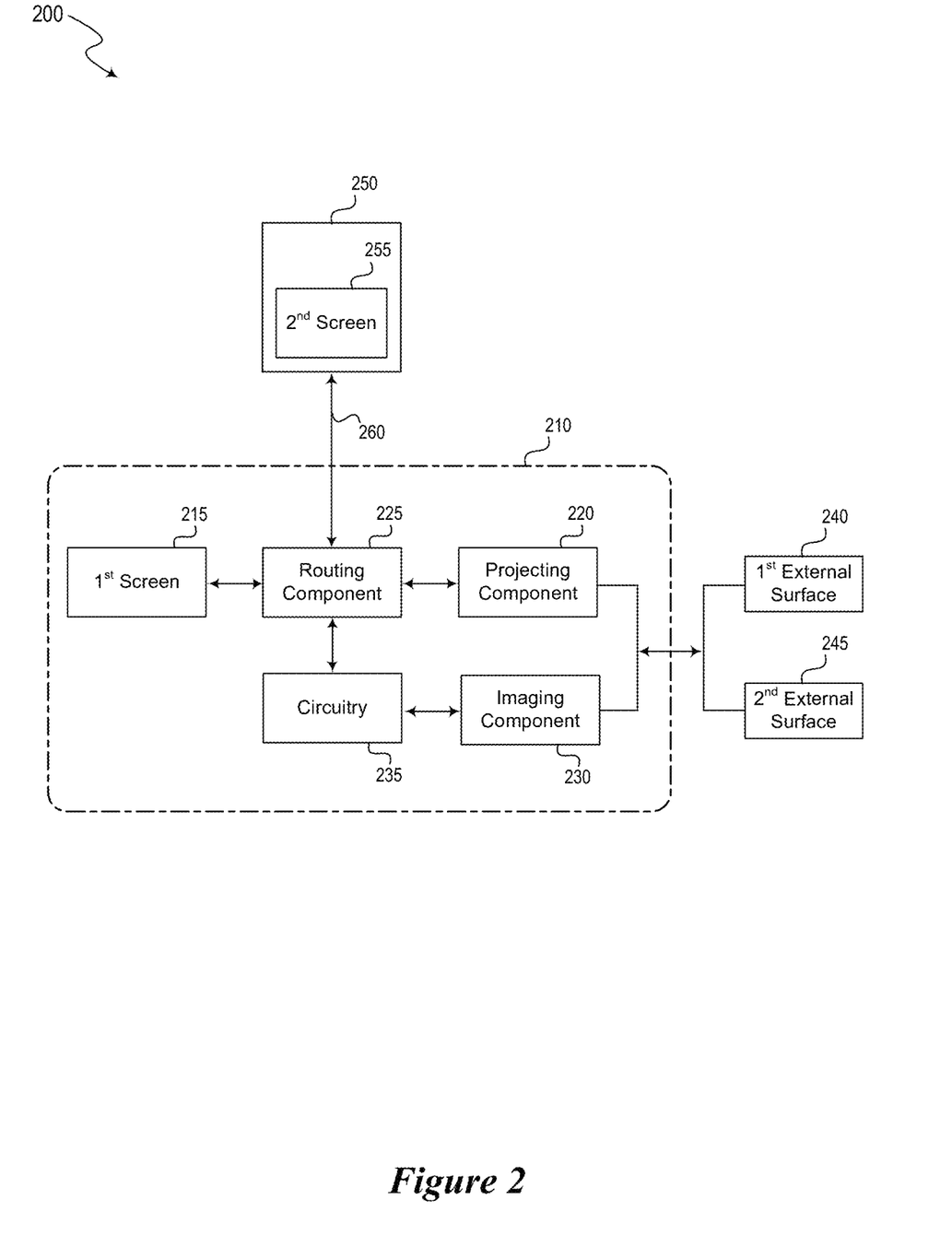
FIG. 2 is a block diagram including a mobile device that supports virtual peripherals in accordance with embodiments of the present technology.

FIG. 2 is a block diagram 200 including a mobile device 210 that supports virtual peripherals in accordance with embodiments of the present technology. The mobile device 210 may be an example of or include aspects of the mobile device 110 described with reference to FIGS. 1A and 1B. The diagram 200 also includes a separate device 250 (e.g., the separate device 155) with a second screen 255. The separate device 250 may be coupled with the mobile device 210 via a link 260 (e.g., the link 160). Further, the diagram 200 depicts a first external surface 240 (e.g., the first external surface 125) and a second external surface 245 (e.g., the second external surface 140), to which the mobile device 210 may project one or more images.

The mobile device 210 may include a first screen 215 (e.g., the first screen 115), a projecting component 220 (e.g., the projecting component 120), a routing component 225 (e.g., the routing component described with reference to FIGS. 1A and 1B), an imaging component 230, and circuitry 235. The projecting component 220 may be configured to project one or more images that the mobile device 210 generates to one or more external surfaces (e.g., the first external surface 240, the second external surface 245) outside of the mobile device 210. In some embodiments, the projecting component 220 may include a flash light component of the mobile device 210. In some embodiments, the projecting component 220 may include a light source (e.g., LEDs, semiconductor laser devices), an optics unit coupled with the light source, which may modulate, guide, or otherwise manage the light generated by the light source (e.g., one or more lenses, micromirrors, optical fibers, photonic waveguides), and a controller (e.g., circuitry or a driver built using CMOS or BiCMOS technology) coupled with the light source and/or the optics unit.

The imaging component 230 may be configured to capture (or sense) images projected to the one or more external surfaces, as well as additional images overlaid on the projected images. Such additional images may include one or more input devices that a user of the mobile device 210 may utilize to enter inputs to the mobile device 210—e.g., a stylus, the user's hands and/or fingers, certain parts of the user's body (e.g., the user's arm), etc. For example, the imaging component 230 may capture (or sense) the user's hands positioned on a projected image of a keyboard displayed on the second external surface 245. Moreover, the imaging component 230 may determine, in conjunction with the circuitry 235 in some embodiments, a relative position of the user's particular finger (e.g., an index finger of the user's right hand, which may be regarded as part of an input device of the user) with respect to the projected image of the keyboard. The imaging component 230 may monitor motions of the user's fingers associated with selecting a particular letter in the projected image of the keyboard, which may be regarded as a key stroke selecting the particular letter, such that the mobile device 210 can determine, in conjunction with the imaging component 230, that the user enters an input to the mobile device 210.

In some cases, the imaging component 230 may sense the user's body gestures overlaid on the projected images (e.g., a presentation slide projected to the first external surface 240) to receive instructions from the user (e.g., advancing to the next slide when the user waves his/her right hand). In some embodiments, the imaging component 230 may include a camera of the mobile device 210. Additionally, or alternatively, the imaging component 230 may include an infrared sensor coupled with an illumination source, image sensors utilizing active-pixel sensors and/or CCDs, or the like. In some embodiments, the imaging component 230 may be configured to monitor for vibrations associated with impacts of fingertips with a surface on which the mobile device 110 is placed—e.g., to improve an efficiency (e.g., reducing errors) associated with receiving inputs from the user.

The routing component 225 may be configured to couple with various components and/or devices to route one or more images that the mobile device 210 generates. In some embodiments, the routing component 225 may be configured to simultaneously couple with two or more components and/or devices—e.g., two or more of the first screen 215, the projecting component 220, the separate device 250 via the link 260. In some embodiments, the routing component 225 may be configured to couple with one component (or device) at a time—e.g., each of the first screen 215, the projecting component 220, the separate device 250 via the link 260, one at a time taking turns. The one or more images may appear seamlessly to the user's eyes—e.g., concurrently displayed (or projected)—as described with reference to FIGS. 1A and 1B.

In some embodiments, the routing component 225 may include a signal processor (e.g., application-specific integrated circuits (ASIC), digital signal processors (DSPs)) having digital and/or analog integrated circuits to receive signals (e.g., signals from the circuitry 235), to process the signals (e.g., encoding, modulating, multiplexing, or otherwise suitably modifying the signals for components and/or devices at one or more destinations), and to transmit the signals (e.g., to the first screen 215, to the routing component 225, to the separate device 250 via the link 260). Additionally, or alternatively, the routing component 225 may include input/output interfaces to receive/transmit various electrical signals, in conjunction with an integrated circuit configured to collect and/or distribute the electrical signals—e.g., a digital hub for the electrical signals.

The circuitry 235 may generate one or more images for the user of the mobile device 210. The circuitry 235 may couple the routing component 225 with one or more components and/or devices (e.g., the first screen 215, the projecting component 220, the link 260 coupled with the separate device 250) and route the one or more images to corresponding destinations (e.g., the first screen 215, the first external surface 240, the second external surface 245, the second screen 255 of the separate device 250). Further, the circuitry 235 may receive inputs, in conjunction with the imaging component 230, from the user based on projecting (or displaying) the one or more images.

By way of example, the circuitry 235 may generate a first image to project to the first external surface 240 using the projecting component 220. The circuitry 235 may couple the routing component 225 with the projecting component 220 to transmit the first image to the projecting component 220 through the routing component 225. Further, the circuitry 235 may generate a second image to display on the first screen 215. The circuitry 235 may couple the routing component 225 with the first screen 215 and display the second image on the first screen 215 such that projecting the first image to the first external surface 240 is concurrent with displaying the second image on the first screen 215—e.g., the user (or users) of the mobile device 210 may observe the first image on the first external surface 240 and the second image on the first screen 215 seamlessly at any given time. Similarly, the circuitry 235 may couple the routing component 225 with the separate device 250 via the link 260. The circuitry 235 may display the first image on the second screen 255 of the separate device 250 such that projecting the first image to the first external surface 240 is concurrent with displaying the first image on the second screen 255—e.g., the user (or users) of the mobile device 210 may observe the first image on the first external surface 240 and the first image on the second screen 255 seamlessly at any given time.

Further, the circuitry 235 may generate a second image (e.g., an image of a peripheral device including a keyboard, a mouse pad, or both) to display to the second external surface 245. The circuitry 235 may determine a relative position of an input device of the user of the mobile device 210, with respect to the second image displayed on the second external surface 245. Thereafter, the circuitry 235 may receive an input from the user based on determining the relative position of the input device, and display the input from the user on the first external surface 240. In this regard, the circuitry 235 may be configured to identify a particular key stroke based on determining the relative position of the input device, where the input from the user corresponds to the particular key stroke. Also, the circuitry 235 may be configured to identify a location of a cursor (e.g., the cursor 131) displayed on the first external surface 240, based on determining the relative position of the input device, where the second image of the peripheral device includes the mouse pad, and the input from the user corresponds to the location of the cursor.

Figure 3:
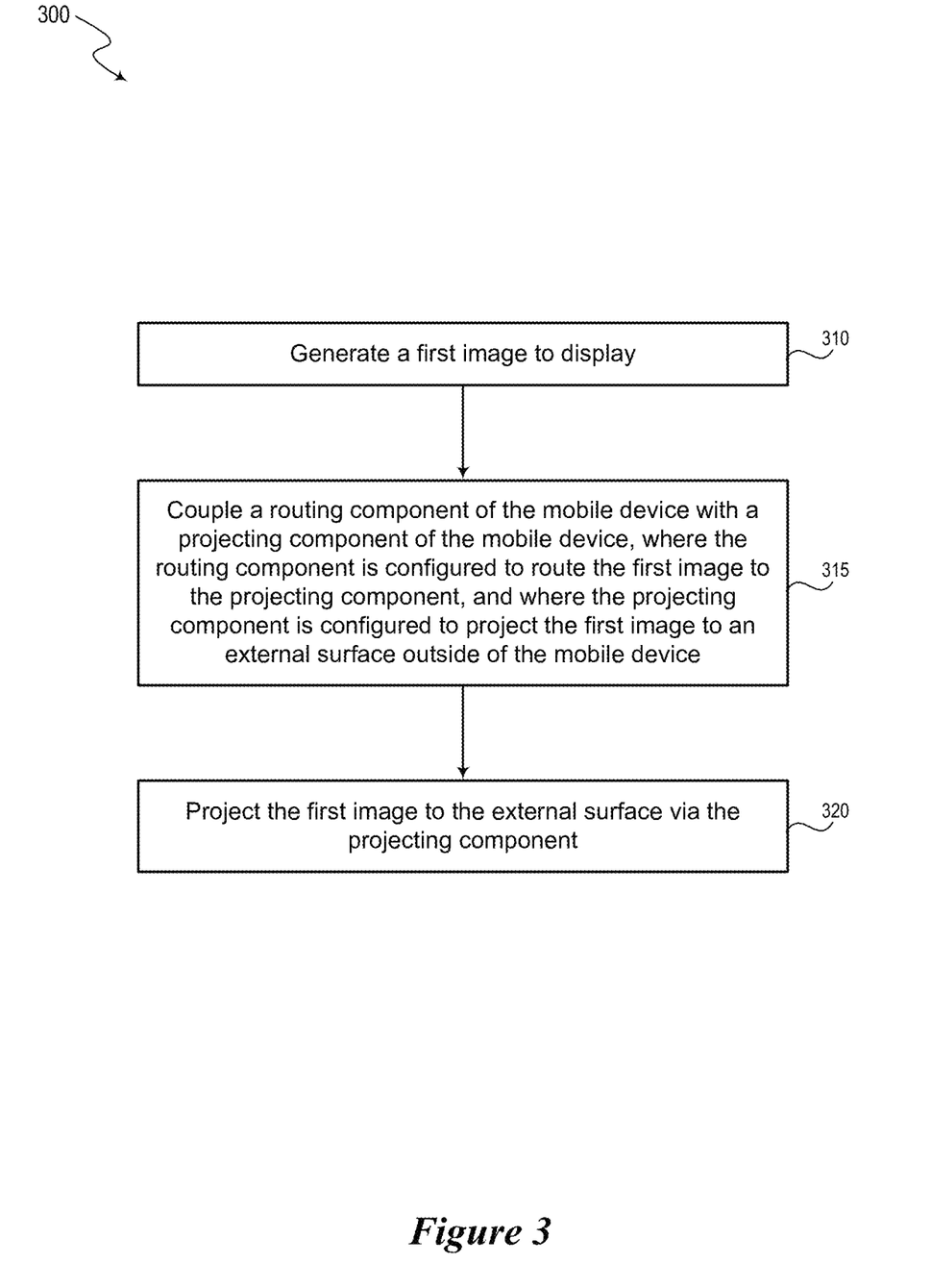
FIGS. 3 and 4 are flowcharts of methods for mobile devices supporting virtual peripherals in accordance with embodiments of the present technology.

FIG. 3 is a flowchart 300 of a method for mobile devices supporting virtual peripherals in accordance with embodiments of the present technology. The flowchart 300 may be an example of or include aspects of a method that a mobile device (e.g., the mobile device 110, the mobile device 210) may perform as described with reference to FIGS. 1A, 1B, and 2.

The method includes generating a first image to display (box 310). In accordance with one aspect of the present technology, the generating feature of box 310 can be performed by the mobile device, in conjunction with the circuitry 235 in some cases, as described with reference to FIGS. 1A, 1B, and 2.

The method further includes coupling a routing component of the mobile device with a projecting component of the mobile device, where the routing component is configured to route the first image to the projecting component, and where the projecting component is configured to project the first image to an external surface outside of the mobile device (box 315). In accordance with one aspect of the present technology, the coupling feature of box 315 can be performed by the mobile device, in conjunction with the circuitry 235 in some cases, as described with reference to FIGS. 1A, 1B, and 2.

The method further includes projecting the first image to the external surface via the projecting component (box 320). In accordance with one aspect of the present technology, the projecting feature of box 320 can be performed by the mobile device, in conjunction with the projecting component 220 in some cases, as described with reference to FIGS. 1A, 1B, and 2.

In some embodiments, the method may further include transmitting the first image to the projecting component through the routing component, after coupling the routing component with the projecting component. In some embodiments, the method may further include generating a second image to display, coupling the routing component with a first screen of the mobile device, and displaying the second image on the first screen, where projecting the first image to the external surface is concurrent with displaying the second image on the first screen.

In some embodiments, the method may further include coupling the routing component with a separate device including a second screen, and displaying the first image on the second screen, where projecting the first image to the external surface is concurrent with displaying the first image on the second screen. In some embodiments, the external surface includes an opaque surface. In some embodiments, the external surface includes a transparent surface.

Figure 4:
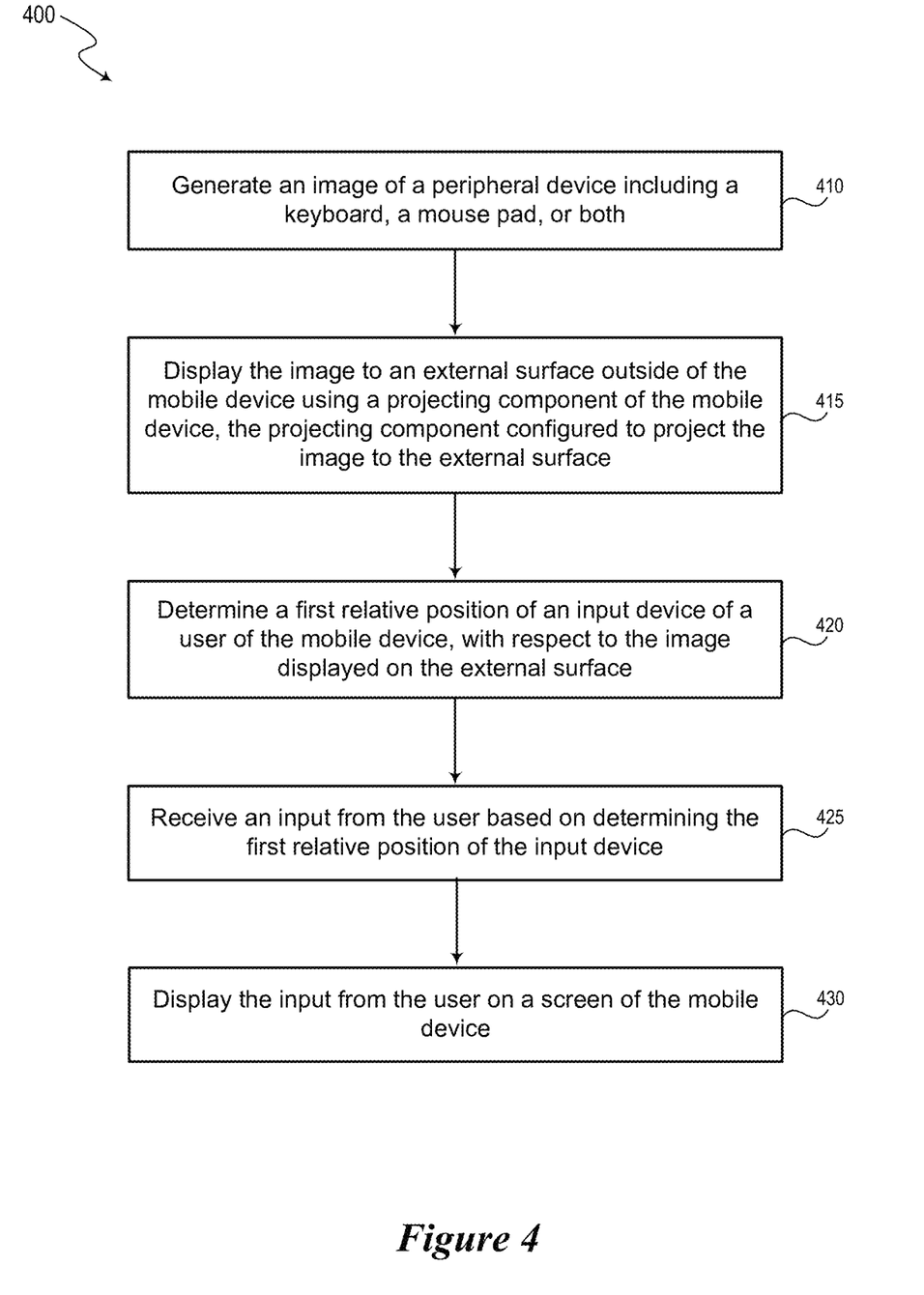

FIG. 4 is a flowchart 400 of a method for mobile devices supporting virtual peripherals in accordance with embodiments of the present technology. The flowchart 400 may be an example of or include aspects of a method that a mobile device (e.g., the mobile device 110, the mobile device 210) may perform as described with reference to FIGS. 1A, 1B, and 2.

The method includes generating an image of a peripheral device including a keyboard, a mouse pad, or both (box 410). In accordance with one aspect of the present technology, the generating feature of box 410 can be performed by the mobile device, in conjunction with the circuitry 235 in some cases, as described with reference to FIGS. 1A, 1B, and 2.

The method further includes displaying the image to an external surface outside of the mobile device using a projecting component of the mobile device, the projecting component configured to project the image to the external surface (box 415). In accordance with one aspect of the present technology, the displaying feature of box 415 can be performed by the mobile device, in conjunction with the projecting component 220 in some cases, as described with reference to FIGS. 1A, 1B, and 2.

The method further includes determining a first relative position of an input device of a user of the mobile device, with respect to the image displayed on the external surface (box 420). In accordance with one aspect of the present technology, the determining feature of box 420 can be performed by the mobile device, in conjunction with the imaging component 230 in some cases, as described with reference to FIGS. 1A, 1B, and 2.

The method further includes receiving an input from the user based on determining the first relative position of the input device (box 425). In accordance with one aspect of the present technology, the receiving feature of box 425 can be performed by the mobile device, in conjunction with the imaging component 230 in some cases, as described with reference to FIGS. 1A, 1B, and 2.

The method further includes displaying the input from the user on a screen of the mobile device (box 430). In accordance with one aspect of the present technology, the displaying feature of box 430 can be performed by the mobile device, in conjunction with the routing component 225 and/or the first screen 215 in some cases, as described with reference to FIGS. 1A, 1B, and 2.

In some embodiments, the method may further include identifying a particular key stroke based on determining the first relative position of the input device, where the input from the user displayed on the screen corresponds to the particular key stroke. In some embodiments, the method may further include identifying a first location of a cursor displayed on the screen based on determining the first relative position of the input device, where the image of the peripheral device displayed on the external surface includes the mouse pad, and the input from the user includes the first location of the cursor.

In some embodiments, the method may further include sensing a movement of the input device within the mouse pad of the image displayed on the external surface, identifying a second location of the cursor based on sensing the movement of the input device, and displaying the second location of the cursor on the screen of the mobile device. In some embodiments, the input device includes one of a stylus, one or more fingers of the user, or a hand of the user.

It should be noted that the methods described above describe possible implementations, and that the operations and the steps may be rearranged or otherwise modified and that other implementations are possible. Furthermore, embodiments from two or more of the methods may be combined.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
   generating a first image to display;
   coupling a routing component of a mobile device with a projecting component of the mobile device, wherein the routing component is configured to route the first image to the projecting component, and wherein the projecting component is configured to project the first image to an external surface outside of the mobile device;
   projecting the first image to the external surface via the projecting component;
   transmitting the first image to the projecting component through the routing component, after coupling the routing component with the projecting component,
   coupling the routing component with a separate device; and
   displaying the first image on the separate device.

2. The method of claim 1, further comprising:
   generating a second image to display;
   coupling the routing component with a first screen of the mobile device; and
   displaying the second image on the first screen, wherein projecting the first image to the external surface is concurrent with displaying the second image on the first screen.

3. The method of claim 1, wherein projecting the first image to the external surface is concurrent with displaying the first image on separate device.

4. The method of claim 1, wherein the external surface includes an opaque surface.

5. The method of claim 1, wherein the external surface includes a transparent surface.

6. An apparatus, comprising:
   a first screen;
   a projecting component configured to project a first image to a first external surface outside of the apparatus;
   a routing component configured to couple with the projecting component and route the first image to the projecting component; and
   circuitry configured to:
      generate the first image;
      couple the routing component with the projecting component;

project the first image to the first external surface via the projecting component;

transmit the first image to the projecting component through the routing component, after coupling the routing component with the projecting component;

couple the routing component with a separate device; and display the first image on the separate device.

7. The apparatus of claim 6, wherein the circuitry is further configured to:

generate a second image to display;

couple the routing component with the first screen; and display the second image on the first screen, wherein projecting the first image to the external surface is concurrent with displaying the second image on the first screen.

8. The apparatus of claim 6, wherein projecting the first image to the external surface is concurrent with displaying the first image on the separate device.

9. The apparatus of claim 6, wherein the projecting component comprises a flashlight component of the apparatus.

* * * * *